June 7, 1927.
J. T. CHRISTIAN
1,631,471
AUTOMOBILE SIGNAL
Filed March 20, 1925
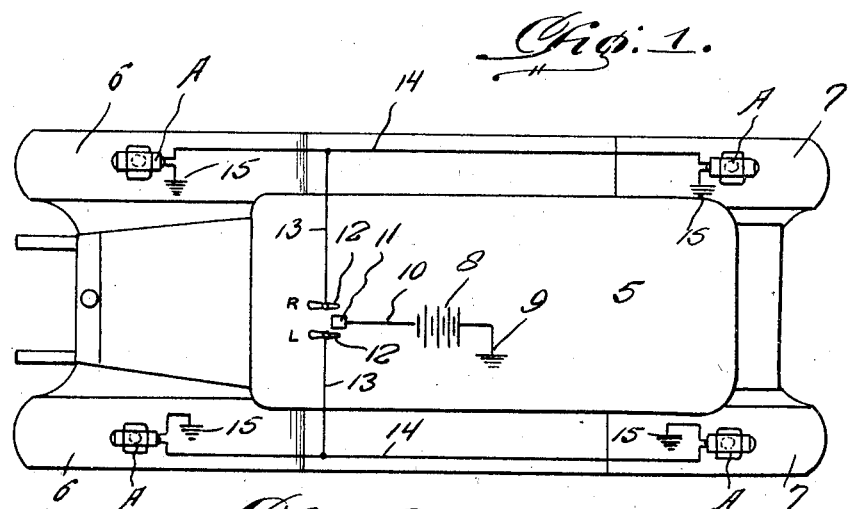
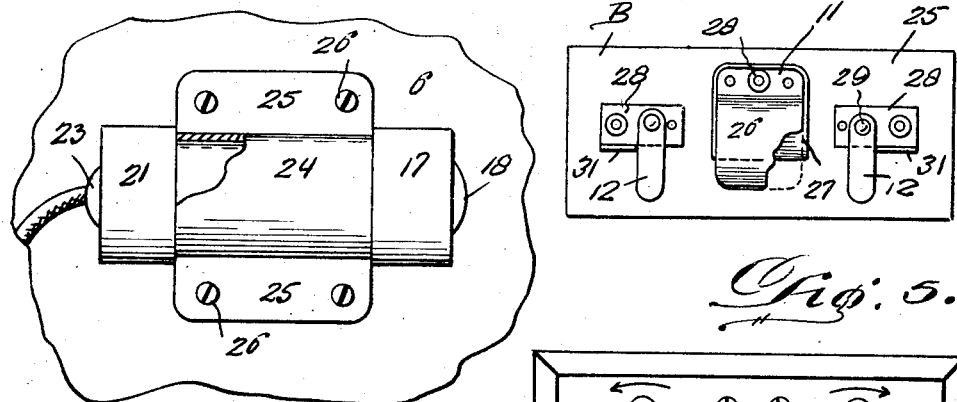
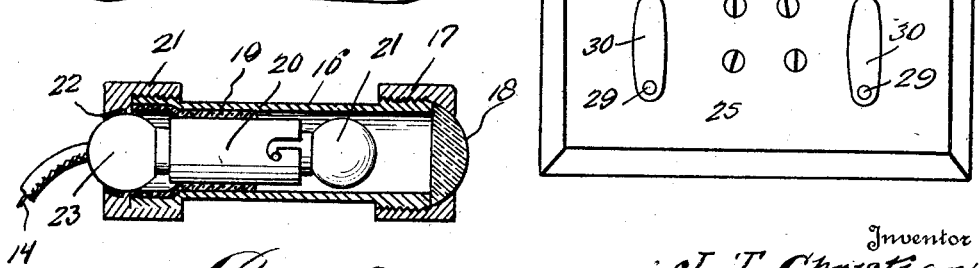
Inventor
J. T. Christian, Patented June 7, 1927.

1,631,471

UNITED STATES PATENT OFFICE.

JOHN T. CHRISTIAN, OF BREMERTON, WASHINGTON.

AUTOMOBILE SIGNAL.

Application filed March 20, 1925. Serial No. 16,997.

The present invention relates to a direction indicating signal for automobiles and like vehicles.

The principal object of the invention is to provide a simple and effective signal adapted to be secured to the fenders of an automobile whereby the intention of the driver of the vehicle to turn in either direction may be signaled to others on the road or street.

Another very important object of my invention is to provide a signal lamp on each fender of the automobile and a switch and circuits whereby the lamps on the right hand fenders may be lighted simultaneously and independently of those on the left hand fenders and vice versa.

A still further object of the invention is to provide a device of this nature which will be strong and durable in use, reliable, not liable to readily get out of order, may be installed cheaply and yet be well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing

Figure 1 is a top plan view of an automobile showing my invention associated therewith diagrammatically, and Fig. 2 is a fragmentary top plan view of a fender showing one of the signals mounted thereon, Fig. 3 is a longitudinal section through one of the signals, Fig. 4 is a rear elevation of the switch mechanism, and Fig. 5 is a front elevation thereof.

Referring to the drawing in detail, it will be seen that I have illustrated a conventional automobile of any suitable type, indicated generally by the numeral 5 and including the fenders 6 and 7, the former at the front of the machine and the latter at the rear thereof.

I provide a signaling device indicated generally by the letter A on each fender 6, 7. I have shown diagrammatically a source of electrical energy at 8 which is grounded as at 9 and a wire 10 leads to a fixed contact 11 of a switch mechanism indicated generally by the letter B.

The movable contacts 12 are engageable with the contact 11 and have wires 13 extending therefrom to wires 14 which lead directly to the signaling devices A which are grounded as at 15. It will be seen that if it is desired to indicate a right hand turn, the upper movable contact 12 in Fig. 1 will be actuated to engage the fixed contact 11 so that the current may flow from the source of electrical energy, through wire 10, through wire 13, through wire 14 and through the signaling devices A on the right hand fenders 6 and 7.

A left hand turn will be indicated when the left hand movable contact is engaged with the fixed contact 11 as will be evident without a detail following of the circuit. As the signaling devices are identical in construction, only one will be described in detail.

Each signaling device A includes a cylinder 16 of suitable strong material such as metal and a cap 17 is threaded on one end thereof for holding the bull's eye transparency 18 in place on one end of the cylinder 16. A sleeve of insulating material 19 is inserted in the other end of the cylinder 16 and receives therein a socket 20 for receiving the incandescent bulb 21 within the cylinder 16 as is clearly illustrated in Fig. 3. A cap 21 is threaded on the end of the cylinder 16 in which the socket is inserted and holds this socket in place. It is preferable to use a strip of packing 22 about the plug 23 which is engaged with the socket 20 so as to prevent leakage between the cap 21 and the plug.

Thus the signaling device is water proof. Each signaling device is held on its respective fender by means of a clip or bracket. The clip or bracket includes a semi-cylindrical body portion 24 which is adapted to be placed over the cylinder 16 between the caps 17 and 21 and the ends of this body are provided with oppositely disposed plates 25 having apertures so that suitable fastening elements 26 may be passed therethrough and through the fender thus holding the signaling device securely in place.

The switch mechanism B is preferably mounted on the dash board of the automobile or in some other convenient place. This switch mechanism includes a base panel 25 constructed of some insulating material. The fixed contact 11 is mounted centrally thereon and includes an upper plate 26 and a lower plate 27 fixed together as at 28 and their free ends are curved outwardly from each other so that the movable contacts 12 may be easily inserted therebetween.

These movable contacts 12 are mounted on base plates 28 by means of rotatable pins 29 which extend through the panel 25 and have attached thereto exteriorly of the panel buttons 30. Each button 30 is alined with its respective contact arm 12 so that when the buttons 30 are moved in the direction of the arrow shown in Fig. 5, the movable contact will be swung into engagement with the fixed contact 11 for closing circuits as described above.

The plates 25 are provided with upstanding stops 31 which limit the movement of the arms 12 and these arms 12 should be normally disposed against the stops 31 at which time the buttons 30 will be disposed as shown in Fig. 5.

From the above detailed description it will be seen that I have provided a very efficient, effective, and reliable signaling apparatus which is convenient to operate and because of the provision of the signaling device on the fender may be seen by other persons very readily, so as to be informed as to the intention of the driver of the vehicle on which this apparatus is mounted.

The present embodiment of the invention has been disclosed in detail merely by way of example and it is evident that numerous changes in the details of construction, in the materials, in the size, and in the combination and arrangement of parts may be made without departing from the spirit or scope of the invention as hereinafter claimed, or sacrificing any of its advantages.

Having thus described my invention, what I claim as new is:—

A device of the class described including a cylinder having one end thereof enlarged and externally threaded, an insulating sleeve disposed in said cylinder and having an enlarged end dispose in said enlargement of the cylinder to prevent longitudinal movement in one direction, said insulating sleeve adapted to receive a socket, and a cap threadedly engaged on the enlargement of the cylinder and adapted to engage a socket in the insulating sleeve and to engage the outer edge of the enlarged portion of the insulating sleeve to hold it in place in the cylinder.

In testimony whereof I affix my signature.

JOHN T. CHRISTIAN.